US006762241B1

(12) United States Patent
Blum et al.

(10) Patent No.: US 6,762,241 B1
(45) Date of Patent: Jul. 13, 2004

(54) POLYURETHANE SOLUTIONS CONTAINING ALKOXYSILANE STRUCTURAL UNITS

(75) Inventors: Harald Blum, Leverkusen (DE); Detlef-Ingo Schütze, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/937,086

(22) PCT Filed: Mar. 21, 2000

(86) PCT No.: PCT/EP00/02484

§ 371 (c)(1),
(2), (4) Date: Sep. 21, 2001

(87) PCT Pub. No.: WO00/59974

PCT Pub. Date: Oct. 12, 2000

(30) Foreign Application Priority Data

Apr. 1, 1999 (DE) .......................... 199 14 879

(51) Int. Cl.⁷ .................... C09D 175/04; C09D 183/00; C08L 75/04; C08L 183/00
(52) U.S. Cl. ................. 524/588; 428/294.7; 428/295.1; 428/297.4; 428/423.1; 428/423.4; 428/425.1; 524/590; 524/591; 524/839; 524/840; 524/864; 524/871; 524/874; 524/875; 528/59; 528/60; 528/61; 528/65; 528/71; 528/76; 528/80; 528/85
(58) Field of Search .................... 428/423.1, 423.4, 428/425.1, 294.7, 295.1, 297.4; 524/588, 590, 591, 839, 840, 864, 871, 874, 875, 834; 528/59, 60, 61, 65, 71, 76, 80, 85, 28, 48, 45

(56) References Cited

U.S. PATENT DOCUMENTS

| 3,886,226 | A | | 5/1975 | Asai et al ...................... 528/28 |
| 4,093,569 | A | | 6/1978 | Reischl et al. .............. 521/137 |
| 4,305,857 | A | | 12/1981 | Reischl ........................ 528/48 |
| 4,310,449 | A | | 1/1982 | Reischl ....................... 525/131 |
| 4,485,227 | A | | 11/1984 | Fox ............................. 528/61 |
| 4,528,873 | A | | 7/1985 | Gaa et al. .................... 524/591 |
| 4,530,990 | A | | 7/1985 | Halpaap et al. ............... 528/53 |
| 4,574,147 | A | | 3/1986 | Meckel ....................... 528/64 |
| 5,225,512 | A | * | 7/1993 | Baghdachi et al. ........... 528/28 |
| 5,866,651 | A | * | 2/1999 | Moren et al. ................ 524/588 |
| 6,046,295 | A | * | 4/2000 | Frisch, Jr. et al. ............ 528/28 |
| 6,057,415 | A | * | 5/2000 | Roesler et al. ................ 528/28 |
| 6,096,823 | A | * | 8/2000 | Shaffer ....................... 524/590 |
| 6,111,010 | A | * | 8/2000 | Yu et al. ..................... 524/588 |
| 6,265,517 | B1 | * | 7/2001 | Stuart ......................... 528/28 |
| 6,545,087 | B1 | * | 4/2003 | Schmalstieg et al. ......... 525/38 |

FOREIGN PATENT DOCUMENTS

| DE | 25 00 921 | 7/1976 |
| EP | 0 831 108 | 3/1998 |
| GB | 1474105 | 5/1977 |
| JP | 8-253545 | 10/1996 |

* cited by examiner

*Primary Examiner*—Rabon Sergent
(74) *Attorney, Agent, or Firm*—Joseph C. Gil; Thomas W. Roy; Gary F. Matz

(57) ABSTRACT

The invention relates to polyurethane solutions with alkoxysilane structural units, processes for the preparation of polyurethane solutions containing alkoxysilane structural units and the use of polyurethane solutions containing alkoxysilane structural units.

23 Claims, No Drawings

POLYURETHANE SOLUTIONS CONTAINING ALKOXYSILANE STRUCTURAL UNITS

BACKGROUND OF THE INVENTION

The invention relates to polyurethane solutions with alkoxysilane structural units, processes for the preparation of polyurethane solutions containing alkoxysilane structural units and the use of polyurethane solutions containing alkoxysilane structural units.

Polyurethane solutions have been known for a long time, e.g. D. Diederich, Methoden der Organischen Chemie [Methods of Organic Chemistry] (Houben-Weyl), volume, E 20, Georg Thieme Verlag, 1997 and the literature cited there.

As a rule, polyurethane solutions are high molecular weight reaction products of aliphatic and/or aromatic di- or polyisocyanates with di- or trifunctional polyols and/or diamines. The reaction of the isocyanate-functional compounds with the hydroxyl- and/or amino-functional compounds takes place here close to the equivalence point to achieve the desired high molecular weights.

To obtain products which are soluble and readily processable, the chain build-up reaction must be stopped when the desired molecular weights or viscosities of the polyurethane solutions are reached. This is usually effected by addition of low molecular weight reactive compounds, such as e.g. monoamine (DE-A 2 633 293), monoisocyanate or acetic anhydride (DE-A 2 500 921, EP-A 129 396), by addition of reactive monofunctional alcohols, such as methanol, or by addition of other compounds having a chain-stopping action, such as e.g. butanone oxime (DE-A 3 142 706).

In technical practice, as a rule a certain excess of stopper reagent is added here in order to ensure reliable stopping. However, this excess can have an adverse effect on coating properties, which can manifest itself e.g. by an odour nuisance, by exudation, by adhesion problems and by the formation of defects in the film due to bubbles and cratering. The storage stability of such solutions can also be impaired as a result. Excess free monoamine, monoisocyanate or even excess reactive monoalcohol can lead to considerable changes in viscosity up to serious degradation phenomena, associated with a loss in properties, due to a creeping reaction with urethane or ester bonds in the polymer, especially during the storage times which are unavoidable in practice.

Since polyurethane solutions as a rule no longer contain reactive end groups, only physical drying takes place after application. Chemical crosslinking via reactive groups at the chain end to form very high molecular weight polymers with an improved level of properties is thus no longer possible.

DE-A 3 401 753 discloses polyurethane solutions with terminal aromatic amino groups which are available for a later crosslinking reaction. However, this requires subsequent addition of a reaction partner.

JP 0 8253 545 describes crosslinkable urethane resin compositions which comprise compounds with two isocyanate-reactive groups and a hydrolysable silyl group. The urethane resins comprise exclusively laterally bonded silyl groups. This leads to crosslinked adhesives or coatings with a high hardness, but only a low elasticity or extensibility. Compounds with two isocyanate-reactive groups and a hydrolysable groups are furthermore unsuitable as a stopper reagent.

The object of the invention was therefore to provide polyurethane solutions which do not have the disadvantages mentioned. In particular, polyurethane solutions which comprise polyurethanes with high molecular weights, can be prepared and stopped reliably, and furthermore when used in coatings cause no problems due to odour nuisance, exudation, inadequate adhesion or inadequate optical properties of the film are to be provided. It must be ensured here that any excess amounts of stopper agent added do not have an adverse effect on the storage stability of the solution and on the properties of the coating, and also that no harmful effect on the health of processors and workers is to be expected.

Surprisingly, it has now been found that polyurethane solutions which comprise in incorporated form compounds with an isocyanate-reactive group and at least one alkoxysilane group as a stopper agent meet the stated requirements. Moreover, an improved stability to hydrolysis, a very good adhesion and a particularly pleasant handle of coatings based on the polyurethane solutions according to the invention have also surprisingly been found. Surprisingly, it has also been found that the polyurethane solutions according to the invention are very particularly suitable for the production of high-quality coatings with a high permeability to water vapour and, associated with this, an excellent wearing comfort. The coatings according to the invention combine here a high permeability to water vapour with a very good water resistance or wet-fastness and a relatively low swelling in water.

Polyurethane solutions which comprise in incorporated form a compound with an isocyanate-reactive group and an alkoxysilane group as a stopper agent and additionally a compound with at least two isocyanate-reactive groups and at least one alkoxysilane structural unit in small amounts surprisingly likewise lead to coatings which meet the abovementioned requirements and moreover have both excellent mechanical properties of the films, in particular a high extensibility and elasticity, and at the same time very high melting or softening temperatures, which is very advantageous for many applications, e.g. in coating of textiles.

Polyurethane solutions which comprise as the stopper agent a reaction product, containing aspartic acid ester structural units, of a compound with a primary amino group and at least one alkoxysilane group with a maleic acid dialkyl ester surprisingly also meet the abovementioned requirements, in spite of the known reduced reactivity of the aspartic acid ester structural units. They moreover have the further advantage that larger amounts of stopper agent are also employed, also at a very early point in time of the reaction and also without the presence of organic solvents, without the risk of the formation of sparingly soluble or insoluble ureas of gel particles. Furthermore, on the other hand coatings which have, in addition to excellent mechanical properties of the film, an excellent, particularly soft handle and a very high wearing comfort, which is very important for many uses, surprisingly can be obtained.

SUMMARY OF THE INVENTION

The invention therefore provides polyurethane solutions with alkoxysilane structural units, characterized in that they are reactions products, in organic solution, of a) at least one at least difunctional polyol of molecular weight 500 to 16,000, b) at least one at least difunctional polyisocyanate of molecular weight 140 to 1,500, c) at least one low molecular weight at least difunctional alcohol and/or amine of molecular weight 32 to 500, d) at least one compound containing at least one alkoxysilane group and an isocyanate-reactive group and e) optionally a monofunctional substance with an amino, alcohol or oxime group, the amount of stopper agent equivalents from component d) being at least 50% of the total amount of stopper agent from d) and e).

The invention preferably provides polyurethane solutions with alkoxysilane structural units, characterized in that they are reaction products, in organic solution, of a) 40 to 92 wt. % of at least one at least difunctional polyol of molecular weight 500 to 16,000, b) 7 to 50 wt. % of at least one at least difunctional polyisocyanate of molecular weight 140 to 1,500, c) 0.5 to 20 wt. % of at least one low molecular weight at least difunctional alcohol and/or amine of molecular weight 32 to 500, d) 0.1 to 5 wt. % of at least one compound containing at least one alkoxysilane group and an isocyanate-reactive group and e) optionally a monofunctional substance with an amino, alcohol or oxime group, the amount of stopper agent equivalents from component d) being at least 75% of the total amount of stopper agent from d) and e).

The invention particularly preferably provides polyurethane solutions, characterized in that they are reaction products, in organic solution, of a) 47 to 88 wt. % of at least one at least difunctional polyol of molecular weight 500 to 16,000, b) 10 to 40 wt. % of at least one at least difunctional polyisocyanate of molecular weight 140 to 1,500, c) 0.8 to 17 wt. % of at least one low molecular weight at least difunctional alcohol and/or amine of molecular weight 32 to 500, d) 0.2 to 3.0 wt. % of at least one compound containing an alkoxysilane group and an isocyanate-reactive group and e) 0–0.5 wt. % of a monofunctional substance with an amino, alcohol or oxime group, the amount of stopper agent equivalents from component d) being at least 95% of the total amount of stopper agent from d) and e).

The invention also provides a process for the preparation of polyurethane solutions with alkoxysilane structural units, characterized in that an isocyanate-functional polyurethane is first prepared in a one- or two-stage reaction from at least one polyol a) and at least one difunctional polyisocyanate b), optionally co-using a low molecular weight component c), and then optionally undergoes a further build up in molecular weight in a further reaction step by reaction with an at least difunctional component c), and is reacted in a concluding reaction step with at least one compound d) containing an alkoxysilane group and an isocyanate-reactive group, optionally co-using a monofunctional component e), to give a high molecular weight polyurethane with alkoxysilane structural units which no longer contains free isocyanate groups, an organic solvent being added either before, during or after the first reaction step in an amount such that the resulting polyurethane solution with alkoxysilane end groups has a solids content of 9 to 65 wt. %.

The invention also provides the use of polyurethane solutions containing alkoxysilane structural units in paints, coatings, sealants and/or adhesives.

DETAILED DESCRIPTION OF THE INVENTION

The term polyurethane solution also includes polyurethane-polyurea solutions, and also solutions which comprise e.g. trimer, uretdione, allophanate and/or biuret structural units in minor amounts, in addition to urethane and/or urea structural units. As a rule, the solutions are clear, but solutions which have a cloudy or opaque appearance are also included, although this is less preferred.

Polyol components a) which are suitable for the preparation of the polyurethane solutions according to the invention are e.g. polyester polyols (e.g. Ullmanns Enzyklopädie der technischen Chemie [Ullmanns Encyclopaedia of Industrial Chemistry], 4th edition, volume 19, p. 62–65). Suitable raw materials for the preparation of these polyester polyols are difunctional alcohols, such as ethylene glycol, 1,2- and 1,3-propylene glycol, 1,3-, 1,4- and 2,3-butanediol, 1,6-hexanediol, neopentylglycol, trimethylhexanediol, triethylene glycol, tetraethylene glycol, hydrogenated bisphenols, trimethylpentanediol, diethylene diglycol, dipropylene diglycol, 1,4-cyclohexanediol and 1,4-cyclohexanedimethanol and difunctional carboxylic acids or anhydrides thereof, such as adipic acid, phthalic acid (anhydride), isophthalic acid, maleic acid (anhydride), terephthalic acid, tetrahydrophthalic acid (anhydride), hexahydrophthalic acid (anhydride), succinic acid (anhydride), fumaric acid, azelaic acid and dimer fatty acids. Polyester raw materials which are also suitable for co-use in minor amounts are monocarboxylic acids, such as benzoic acid, 2-ethylhexanoic acid, oleic acid, soya oil fatty acid, stearin fatty acid, groundnut oil fatty acid, linseed oil fatty acid, nonanoic acid, cyclohexanemonocarboxylic acid, isononanoic acid, sorbic acid and conjuene fatty acid, carboxylic acids or alcohols of higher functionality, such as trimellitic acid (anhydride), butanetetracarboxylic acid, trimer fatty acids, trimethylolpropane, glycerol, pentaerythritol, castor oil and dipentaerythritol, and other polyester raw materials not mentioned by name.

Polyol components a) which are also suitable are polycarbonate diols which can be obtained e.g. by reaction of diphenyl carbonate or dimethyl carbonate with low molecular weight di- or triols or epsilon-caprolactone-modified di- or triols.

Polyol components a) which are also suitable are hydroxy-functional silicones or polysiloxanes, such as e.g. Baysilon™ OF (Bayer A G).

Lactone-based polyester diols are also suitable, these being homo- or copolymers of lactones, preferably addition products, containing terminal hydroxyl groups, of lactones, such as e.g. epsilon-caprolactone or gamma-butyrolactone, on difunctional starter molecules. Suitable starter molecules can be the abovementioned diols, or also low molecular weight polyester diols or polyether diols. Instead of the polymers of lactones, the corresponding hdyroxycarboxylic acids can also be employed.

Polyol components a) which are also suitable are polyether polyols. They are obtainable e.g. by polymerization of ethylene oxide, propylene oxide and/or tetrahydrofuran by themselves, e.g. in the presence of $BF_3$ or basic catalysts, or by addition of these compounds, optionally also as a mixture or in succession, on to starter components with reactive hydrogen atoms, such as alcohols, amines, amino-alcohols or water.

The polyol components a) mentioned can also be employed as mixtures, optionally also together with other polyols a), such as e.g. polyester amides, polyether esters, polyacrylates or polyols based on epoxy resins.

The hydroxyl number of the polyols a) is 5 to 350, preferably 8 to 200 mg KOH/g substance. The molecular weights of the polyols a) are between 500 and 25,000, preferably between 500 and 15,000, at least a portion of polyols a) with a molecular weight of >9,000 g/mol being employed in a preferred embodiment.

Preferred components a) are hydrolysis-stable polyols of molecular weight 300 to 3,500, in particular 900 to 2,500, in particular comprising to the extent of at least 50% polycarbonate diols, which can be employed together with tetrahydrofuran diols and/or di- or trifunctional polyethers based on propylene oxide or propylene oxide/ethylene oxide, or mixtures of the hydrolysis-stable polyols mentioned, where, if trifunctional polyether polyols are used, these are employed at most in amounts of up to 4 wt. %, based on the total solids content of the polymer. These hydrolysis-stable polyols can also be employed together with polyester polyols, preferably polyester polyols with a comparatively good stability to hydrolysis, such as e.g. polyesters based on phthalic anhydride, isophthalic acid, dimer fatty acid, hexanediol and/or neopentylglycol.

In another preferred embodiment, hydrophilic polyols, such as e.g. ethylene oxide polyethers, ethylene oxide/propylene oxide polyethers or polyesters based on triethylene glycol or tetraethylene glycol and dicarboxylic acids, are employed as component a) in amounts such that coatings prepared with them are permeable to water vapour. The polyurethane then preferably comprises as component a) 10 to 60 wt. % hydrophilic polyols, in addition to 23 to 50 wt. % non-hydrophilic polyols, in each case based on the total solids content of the polyurethane, the total amount of component a) being not more than 92 wt. % of the total solids content of the polyurethane.

Corresponding polyurethane solutions are very particularly suitable for the preparation of high-quality coatings with a high permeability to water vapour and the excellent wearing comfort associated therewith. The coatings according to the invention combine here a high permeability to water vapour with a very good water resistance or wet-fastness and a relatively low swelling in water.

The total content of hydrophilic constituents—polyols a) and optionally hydrophilic diols or diamines d)—here is 10 to 60, preferably 20 to 45 wt. %, based on the total solids content of the polyurethane solution.

Component b) comprises at least one organic at least difunctional polyisocyanate of molecular weight 140 to 1,500, preferably 168 to 500. Suitable polyisocyanates are e.g. hexamethylene-diisocyanate (HDI), isophorone-diisocyanate (IPDI), 4,4'-diisocyanato-dicyclohexylmethane (HI2MDI), 1,4-butane-diisocyanate, $H_6$-2,4- and/or -2,6-diisocyanato-toluene, hexahydrodiisocyanatoxylene, 2,4- or 2,6-diisocyanatotoluene (TDI), xylylene-diisocyanate and 4,4'-diisocyanatodiphenylmethane (MDI). Polyisocyanates which are known per se and are based on the isocyanates mentioned and also other isocyanates and have uretdione, biuret, isocyanurate, iminoxadiazinedione or urethane structural units can also be co-used, but this is not preferred.

The exclusive use of aliphatic and/or cycloaliphatic difunctional isocyanates of molecular weight 168 to 262, such as isophorone-diisocyanate and/or hexamethylene-diisocyanate and/or diisocyanatodicyclohexylmethane (Desmodur™ W, Bayer A G) and/or $H_6$-2,4- and/or -2,6-diisocyanatotoluene, is preferred, component b) particularly preferably comprising isophorone-diisocyanate or $H_6$-2,4- and/or -2,6-diisocyanatotoluene to the extent of at least 75 wt. %.

The exclusive use of aromatic diisocyanates of molecular weight 174 to 280, in particular 2,4- and/or 2,6-diisocyanatotoluene and/or 4,4'-diisocyanatodiphenylmethane, is also preferred.

In a preferred embodiment, difunctional isocyanates containing allophanate groups are employed as component b). Such components are obtained by reacting a diisocyanate, preferably aromatic diisocyanates, such as e.g. MDI or TDI, with aliphatic linear monoalcohols having 4 to 18 carbon atoms, such as e.g. n-butanol, hexanol, 2-ethylhexanol or stearyl alcohol, optionally using suitable catalysts, such as e.g. zinc acetylacetonate, at temperatures of e.g. 40 to 110° C. to form allophanate. The reaction here of 2 molecules of diisocyanate with one molecule of monoalcohol leads to the formation of a diisocyanate with an allophanate structural unit, it also being possible for higher homologues to be formed. It is also possible to carry out the allophanate formation in situ during the build-up of the polyurethane according to the invention. Surprisingly, the co-use of diisocyanates containing allophanate groups leads to polyurethanes which allow the production of coatings with particularly good resistance properties, e.g. to the action of solvents or to water, and a pleasant handle.

Component c) is at least one low molecular weight compound of the molecular weight range of 32 to 500 with at least two groups which are reactive towards isocyanate groups. These reactive groups are preferably hydroxyl and/or primary or secondary amino groups.

Suitable components c) are e.g. ethylene glycol, 1,2- or 1,3-propylene glycol, 1,4-butanediol, neopentylglycol, 1,6-hexanediol, trimethylpentanediol, trimethylolpropane, glycerol, the reaction product of 2 mol propylene carbonate and 1 mol hydrazine, ethylenediamine, diethylenetriamine, isophoronediamine, hexamethylenediamine, acetone-azine, 4,4-diaminodicyclohexylmethane, hydroxyethylethylenediamine, ethanolamine, diethanolamine, isopropanolamine, diisopropanolamine, N-methylethanolamine, aminomethylpropanol, hydrazine (hydrate), propylenediamine, dimethylethylenediamine, adipic acid dihydrazide, 2-aminoethyl aminoethanesulfonate, the 1:1 reaction product of acrylic acid and isophoronediamine or ethylenediamine, dimethylolacetic acid, 2,2'-dimethylolpropionic acid, 2,2'-dimethylolbutyric acid, 2,2'-dimethylolpentanoic acid, sulfonate diols optionally containing ether groups, of the type described in U.S. Pat. No. 4,108,814, amino-functional sulfonates with one or two amino groups and N-2-(aminoethyl)-3-aminopropyltrimethoxysilane.

If a component c) is co-used in the first reaction step carried out in one stage or two stages, dihydroxy-functional compounds are preferably employed, in particular ethylene glycol, 1,4-butanediol, 1,6-hexanediol or sulfonate diols containing ether groups.

If a component c) is employed in the second reaction step, preferably after addition of solvent, diamino-functional compounds are preferably employed, in particular ethylenediamine, isophoronediamine, 4,4-diaminodicyclohexylmethane, hydrazine (hydrate), adipic acid dihydrazide or 2-aminoethyl aminoethanesulfonate.

In a preferred embodiment, diamino-functional components c) containing alkoxysilane groups are co-used as chain-lengthening agents, preferably in amounts of up to 2 wt. %. The use of larger amounts of such components c) surprisingly leads to polyurethane solutions which, when used as coatings, result in a too high a hardness, too low an extensibility or elasticity, above all at low temperatures, and a relatively hard, cold and rather unpleasant handle.

In a preferred embodiment, hydrophilic difunctional components of the abovementioned type containing salt groups are employed as component c) in amounts of 2 to 16 wt. %, particularly preferably 2.5 to 13 wt. %, optionally in combination with hydrophilic polyols a), in order to impart to the corresponding coatings a character which is permeable to water vapour.

Hydrophilic components c) are particularly preferably employed here together with the abovementioned hydrophilic polyols a). Coatings with a particularly high permeability to water vapour can be produced as a result.

In a preferred embodiment, hydrazine (hydrate), adipic acid dihydrazide and/or the reaction product of 2 mol propylene carbonate and 1 mol hydrazine are co-used as component c) in amounts of 0.1 to 4.5 wt. %. Polyurethane solutions with a particularly high stability towards heat and discoloration can be obtained here.

Alkoxysilanes which are suitable as component d) are aminoalkylsiloxanes, such as e.g. 3-aminopropyltriethoxysilane, 3-aminopropyltrimethoxysilane, 3-aminopropyltributoxysilane, 2-aminoethyltriethoxysilane, 2-aminoethyltrimethoxysilane, 2-aminoethyltributoxysilane, 4-aminobutyltriethoxysilane, 4-aminobutyltrimethoxysilane, reaction products of the alkoxysilanes mentioned with maleic acid dialkyl esters, such as e.g. maleic acid diethyl ester, maleic acid dimethyl ester or maleic acid dibutyl ester, N-phenylaminopropyltrimethoxysilane, bis-(3-trimethoxysilylpropyl)amine, compounds of the type mentioned in which one or two of the alkoxy groups are replaced by alkyl groups and mixtures of the alkoxysilanes mentioned and also other alkoxysilanes.

Components d) are employed in amounts of 0.1 to 5, preferably 0.2 to 3.0, particularly preferably 0.3 to 1.3 wt. %.

In a preferred embodiment, the mathematically determined content of —Si—(O—)$_3$ structural units of the solids of the polyurethane solutions is less than 1.2 wt. %. With these e.g. coatings for textiles and leather with a high level of mechanical properties, in particular regarding extensibility and elasticity, and a pleasantly soft handle can be obtained. Higher contents of these structural units lead to coatings which show these desired properties to only a reduced degree.

In a preferred embodiment, a monofunctional alkoxysilane is employed as component d) in amounts of 0.3 to 1.3 wt. %, together with 0.1 to 2.0 wt. % of a diamino-functional alkoxysilane component c), where the number of terminal alkoxysilane groups must be at least 50 wt. % of all the incorporated alkoxysilane groups. Corresponding polyurethane solutions surprisingly also lead to coatings which meet the stated requirements and moreover have both excellent mechanical properties of the film, in particular a high extensibility and elasticity, and at the same time very high melting or softening temperatures, which is very advantageous for many uses, e.g. in coating of textiles.

With higher contents of lateral alkoxysilane structural units, on the other hand, coatings which surprisingly are significantly less elastic and extensible and have a rather unpleasant, cold handle result. Decreases must then also often be made in the adhesion properties.

In another preferred embodiment, a monoamino-functional reaction product of a monoamino-functional alkoxysilane with 0.5 to 1.1, preferably 0.9 to 1.05 equivalents of maleic acid alkyl esters is employed as component d), optionally together with a diamino-functional alkoxysilane.

Polyurethane solutions which comprise as the stopper agent a reaction product, containing aspartic acid ester structural units, of a compound with a primary amino group and at least one alkoxysilane group with a maleic acid dialkyl ester and additionally a diamino-functional compound containing alkoxysilane structures in a minor amount are also very particularly suitable e.g. for the production of high-quality coatings.

Suitable monofunctional blocking agents e) which are optionally to be co-used in the preparation of the polyurethane solutions according to the invention can be e.g.: butanone oxime, cyclohexanone oxime, acetone oxime, malonic ester, triazole, dimethylpyrazole, monofunctional amines, such as e.g. dibutylamine and diisopropylamine, and monofunctional alcohols, such as e.g. ethanol. If components e) are employed, this preferably takes place such that component e) is added first, and thereafter component d). This ensures that the polyurethane solutions according to the invention no longer comprise unreacted components e).

The amount of stopper reagents d) containing alkoxysilane groups is at least 50, preferably 75, especially preferably at least 95 wt. %, based on the total amount of stopper agents d) and e).

The polyurethane solutions according to the invention with alkoxysilane groups show a storage stability which is appropriate in practice at room temperature up to 75° C. After application, drying takes place at room temperature to 200° C., preferably at 60 to 160° C.

The polyurethane solutions according to the invention with alkoxysilane groups are prepared by a procedure in which an isocyanate-functional polyurethane is first prepared in a one- or two-stage reaction from at least one polyol a) and at least one difunctional polyisocyanate b), optionally co-using a low molecular weight hydroxy-functional component c), and then optionally undergoes a further build up in molecular weight in a further reaction step by reaction with an at least difunctional component c), optionally co-using an at least diamino-functional component d) containing alkoxysilane groups and is reacted in a concluding reaction step with a monoamino-functional component d) containing alkoxysilane groups, optionally co-using a monofunctional component e), to give a high molecular weight polyurethane with alkoxysilane end groups which no longer contains free isocyanate groups, an organic solvent being added either before, during or after the first reaction step in an amount such that the resulting polyurethane solution with alkoxysilane end groups has a solids content of 9 to 65 wt. %.

In one process variant, a one-stage reaction of all the components a), b) and optionally c) can be carried out, usually in the presence of suitable solvents, to give an isocyanate-functional high molecular weight polyurethane, the desired viscosity and therefore the molecular weight necessary to achieve the required properties optionally being achieved by subsequently adding a small amount of polyisocyanate b) and/or low molecular weight difunctional component c), and the chain-stopping reaction then being carried out by addition of a monoamino-functional alkoxysilane. Monoamino-functional alkoxysilanes are preferably employed in amounts of 0.3 to 1.3 wt. % in this process variant.

The reaction of the components as a rule is carried out at room temperature up to 120° C., the reaction usually being carried out at a higher temperature, e.g. at 60 to 120° C., at the start of the preparation and the reaction being carried out at lower temperatures, e.g. at room temperature to 60° C., at the end during the chain lengthening to the chain-stopping reaction.

The reaction of the components can be carried out with addition of conventional catalysts, such as e.g. dibutyltin dilaurate, tin 2-octoate, dibutyltin oxide or diazabicyclononane.

Suitable solvents for the preparation of the polyurethane solutions according to the invention are e.g. dimethylformamide, dimethylacetamide, N-methylpyrrolidone, methyl ethyl ketone, methyl isobutyl ketone, cyclohexanone, toluene, xylene, tertbutanol, isopropanol, ethyl acetate, butyl acetate, methoxypropanol, butylglycol, methoxypropyl acetate and isobutanol. The choice of the nature, amount and time of addition of the solvent or solvent mixtures must be made such that solubility of the end product or of the intermediate stages exists, the viscosities are in a scope which can be managed technically, i.e. usually <200,000 mPas (23° C.), and a reaction of the solvents with the raw materials of the polyurethane is very largely ruled out. That is to say e.g. that alcoholic solvents should be used only if only isocyanate-amine reactions or reactions which proceed at a comparable rate take place during the preparation of the polyurethane.

The solids contents of the polyurethane solutions according to the invention are 9 to 65, preferably 20 to 50 wt. %.

The viscosities of the polyurethane solutions according to the invention are 1,000 to 200,000 mPas (23° C.), preferably 3,000 to 80,000 mPas (23° C.).

The molecular weights of the polyurethane solutions according to the invention can be determined e.g. by gel permeation chromatography. They are between 4,000 and 500,000, preferably between 25,000 and 250,000 g/mol.

Conventional auxiliary substances and additives, such as e.g. stabilizers, light stabilizers, flow auxiliaries, matting agents, heat stabilizers, release agents, antioxidants, UV absorbers, HALS active compounds, defoamers, adhesion promoters, antistatics, preservatives and catalysts, can be added before, during or after the preparation or before or during use of the polyurethane solutions according to the invention.

The polyurethane solutions according to the invention with alkoxysilane structural units are suitable for use in paints, coatings, sealing compositions, printing inks and adhesives. They can be used here by themselves and/or after addition of the conventional auxiliary substances, additives, pigments, fillers, plasticizers, solvents and diluents and/or in combination with other polymers or polymer solutions or oligomers, such as e.g. polyurethane solutions, polyurea solutions, polyurethane-polyurea solutions, co- and homopolymer solutions, chlorinated rubber solutions, nitrocellulose solutions, cellulose acetate/butyrate solutions, polyacrylate solutions, polyether (solutions), polyamide solutions, polyepoxide (solution), polyester (solutions), polyisocyanate (solutions), melamine-aldehyde resin (solutions), urea resin (solutions), polybutadiene solutions or polyolefin solutions.

Suitable fields of use are e.g. coating of textiles, coating of leather, coating of imitation leather, coating and painting of plastics, painting of metals, painting and coating of wood, derived timber products and furniture, coating and painting of all types of mineral substrate and road-marking paints. The polyurethane solutions according to the invention can be employed here e.g. as a primer, intermediate coat, filler, base paint, top paint, clear paint, one-coat paint, microporous coating, adhesive base, top coat, finish, direct coat, intermediate coat or foam coat.

The application can be carried out by all the processes used industrially, such as e.g. pouring, dipping, rollercoating, rolling, brushing, spraying, knife-coating or coagulation.

EXAMPLES

Example 1

520 g of a difunctional propylene oxide polyether with a molecular weight of 2,000 g/mol are weighed into a 3 l reaction vessel with a stirring, cooling and heating device and are heated to 60° C. 205 g 4,4'-MDI (Desmodur 44M, Bayer A G) are then added and the mixture is reacted at 70° C. until the theoretical isocyanate value has been reached or the value is slightly below this. 182 g dimethylformamide are then added and the polymer is dissolved. 39.8 g butane-1,4-diol are then added at 50° C. in the course of 30 minutes, and a further 271 g dimethylformamide are subsequently added. When the theoretical isocyanate value is reached, 403 g methyl ethyl ketone and 400 g toluene are added and the mixture is cooled to 30° C. A chain-lengthening solution is prepared from 15.6 g isophoronediamine and 104 g toluene in a separate vessel. 60% of this solution is added all at once to the isocyanate-functional polyurethane solution. The decrease in the isocyanate content is monitored here by IR spectroscopy. The molecular weight, determined indirectly via viscosity measurements, is built up by addition of small amounts of the chain-lengthening solution in several steps (a further 15% of the chain-lengthening solution is added in total). When a viscosity of approx. 16,000 mPas is reached, 18.6 g of a 1:1 reaction product of 3-aminopropyltriethoxysilane and maleic acid diethyl ester are added to interrupt the reaction and the mixture is stirred until no further isocyanate groups are detectable. A 35% polyurethane solution with terminal alkoxysilane structural units is obtained, and the viscosity is 15,000 mPas.

During storage at room temperature in a closed vessel for 3 months, the viscosity remained constant, and after storage in a closed vessel at 60° C. for 4 weeks, a viscosity of 16,000 mPas was found. A stability of the viscosity which is appropriate in practice thus exists.

Testing in use as a coating film (film weight 45 g/m$^2$) gave the following values:

100% modulus: 2.1 MPa

Tensile strength/elongation at break (dry): 14.3 MPa/790%

Tensile strength/elongation at break (wet): 14.0 MPa/730%

Swelling in volume with ethyl acetate: 350%

Melting point: 155° C.

These are typical film values such as are required e.g. if the product is used as a high-quality flexible direct coat in coating of textiles.

Comparison Example 2a

For comparison purposes, experiment 1) was repeated, but without addition of a stopper reagent. The 35% polyurethane solution had a viscosity of 13,000 mPas.

On storage at 60° C. in a closed vessel, the viscosity rose so much after a few days that measurement of the viscosity was no longer possible. The solution showed no stability appropriate in practice.

This confirms the activity of the monoamino-functional alkoxysilane as a stopper reagent.

Example 2b

For comparison purposes, experiment 1) was repeated, but the amount of stopper agent was increased by 30% in order to determine the influence of excess stopper reagent on the storage stability. The 35% polyurethane solution had a viscosity of 13,000 mPas. After storage at 60° C. in a closed vessel for 4 weeks, a viscosity of 14,500 mPas was determined. This solution therefore has a storage stability which is appropriate in practice.

Example 3

450.5 g of a difunctional adipic acid-hexanediol-neopentylglycol polyester with a molecular weight of 1,700 g/mol are weighed into a 3 l reaction vessel with a stirring, cooling and heating device and are heated to 70° C. 122.1 g isophorone-diisocyanate (Desmodur I, Bayer A G) are then added and the mixture is reacted at 100° C. until the theoretical isocyanate value has been reached. 604 g toluene are then added, the polymer is dissolved and the solution is cooled to 30° C. Directly after addition of 302 g isopropanol, a chain-lengthening solution of 46.8 g isophoronediamine, 302 g isopropanol and 250 g methoxypropanol prepared in a separate vessel is metered in over a period of 30 minutes. After the end of the addition, a marked increase in viscosity is to be observed. 15 minutes after the addition a viscosity of 20,000 mPas (23° C.) is reached, 6.2 g aminopropyltriethoxysilane are then added, and the mixture is stirred until isocyanate groups can no longer be detected. A 30% polyurethane solution with terminal alkoxysilane structural units is obtained, and the viscosity is 20,500 mPas.

After storage in a closed vessel at 60° C. for 4 weeks, the viscosity is 22,000 mPas.

Comparison Example 4

For comparison purposes, experiment 2) was repeated, but an equivalent amount of dibutylamine was employed as the chain stopper reagent.

On storage in a closed vessel at 50° C., the viscosity fell from originally 22,000 mPas to 8,500 mPas. This is probably to be attributed to a reaction of excess dibutylamine with the ester bonds of the polyol which lowers the molecular weight and therefore has a viscosity-reducing effect.

Comparison Example 5

For comparison purposes, experiment 2) was repeated, but an equivalent amount of butanone oxime was employed as the chain stopper reagent. A polyurethane solution which is stable on storage at 60° C. was also to be obtained with this.

For comparison of the coating properties, coating films were produced from the polyurethane solutions according to example 3) and comparison example 5), dried and tested. The film weight was 42 g/m².

The following results were obtained.

|  | Example 3 | Comparison example 5 |
|---|---|---|
| 100% modulus | 5.8 MPa | 4.5 MPa |
| Tensile strength/ elongation at break (dry): | 58.3 MPa/680% | 45.0 MPa/450% |
| Tensile strength/ elongation at break (after a hydrolysis test of 2 weeks) | 55.4 MPa/660% | 35.0 MPa/450% |
| Swelling in volume in ethyl acetate | 350% | 450% |
| Melting point | 165° C. | 165° C. |

The results show that the polyurethane solution according to the invention allows the production of coatings with better mechanical values of the film, improved resistances to hydrolysis and less swelling with ethyl acetate.

Example 6

270 g of a difunctional hydrophilic ethylene oxide polyether with a molecular weight of 2,000 g/mol, 57.9 g of a difunctional aliphatic polycarbonate diol with a molecular weight of 2,000 g/mol (Desmophen 2020, Bayer A G), 57.9 g of a difunctional tetrahydrofuran polyether with a molecular weight of 2,000 g/mol and 52 g butane-1,4-diol are weighed into a 3 l reaction vessel with a stirring, cooling and heating device and are heated to 60° C. 203 g 4,4'-MDI (Desmodur 44M, Bayer A G) as well as 748 g dimethylformamide and 748 g toluene are then added and the mixture is reacted at 70° C. until the desired viscosity is reached. If the isocyanate content of 0 is reached before the target viscosity (20–30,000 mPas at 23° C.) is reached, small amounts of 4,4'-MDI and optionally also small amounts of butane-1,4-diol are subsequently added. When the target viscosity is reached, 4.5 g 3-aminopropyltrimethoxysilane are added and the mixture is stirred until the isocyanate value is 0, and if appropriate a small amount of chain-stopping monoamino-functional alkoxysilane must be subsequently added. A 30% polyurethane solution with terminal alkoxysilane structural units is obtained, and the viscosity is 24,000 mPas.

During storage at room temperature in a closed vessel for 3 months, the viscosity remained constant. After storage in a closed vessel at 60° C. for 4 weeks, a viscosity of 24,000 mPas was determined.

Testing in use as a coating film gave the following values:

| 100% modulus: | 5.4 MPa |
|---|---|
| Tensile strength/elongation at break (dry): | 32.9 MPa/590% |
| Tensile strength/elongation at break (wet): | 30.7 MPa/850% |
| Swelling in volume with ethyl acetate: | 80% |
| Swelling in volume with water: | 80% |
| Permeability to water vapor according to the SST: | 15,000 g/m²/d |

The permeability to water vapour is measured according to the standards specified in the publication DS 2109 TMI of the British Textile Technology Group, Menchester, England.

Surprisingly, particularly high-quality coatings with a high permeability to water vapour, such as are required e.g. in the production of high-quality flexible direct coats or top coats for textile materials which are permeable to water vapour in the clothing and hygiene sector, can also be produced.

Example 7

450.5 g of a difunctional adipic acid-hexanediol-neopentylglycol polyester with a molecular weight of 1,700 g/mol are weighed into a 3 l reaction vessel with a stirring, cooling and heating device and are heated to 70° C. 122.1 g isophorone-diisocyanate (Desmodur I, Bayer A G) are then added and the mixture is reacted at 100° C. until the theoretical isocyanate value has been reached. 608 g toluene are then added, the polymer is dissolved and the solution is cooled to 30° C. Directly after addition of 304 g isopropanol, a chain-lengthening solution of 39.9 g isophoronediamine, 304 g isopropanol, 252 g methoxypropanol and 9.0 g N-2-(aminoethyl)-3-aminopropyltrimethoxysilane prepared in a separate vessel is metered in over a period of 30 minutes. After the end of the addition, a marked increase in viscosity is to be observed. 15 minutes after the addition, a viscosity of 22,000 mPas (23° C.) is reached, 6.2 g aminopropyltrimethoxysilane are then added and the mixture is stirred until isocyanate groups are no longer detectable.

A 30% polyurethane solution with terminal and lateral alkoxysilane structural units is obtained, and the viscosity is 20,500 mPas.

Testing in use as a coating film gave the following values:

| | |
|---|---|
| 100% modulus | 5.9 MPa |
| Tensile strength/ elongation at break (dry): | 51.9 MPa/500% |
| Tensile strength/ elongation at break (after a hydrolysis test of 2 weeks): | 50.7 MPa/450% |
| Swelling in volume in ethyl acetate | 350% |
| Melting point: | 210° C. |

If this result is compared with the test result from comparison example 5), which contains no lateral or terminal alkoxysilane groups but instead butanone oxime as the stopper reagent, it can be seen that the polyurethane solution according to the invention has an excellent level of mechanical properties, in particular an excellent resistance to hydrolysis, in spite of the use of a polyester polyol, and a significantly higher melting point, which is particularly advantageous for some uses, e.g. in the textile coating sector.

This result is particularly surprisingly, because the combination of a high level of mechanical properties of the film, in particular a very high extensibility or elasticity, very good resistance to hydrolysis and high melting point cannot be achieved with polyurethane solutions according to the prior art.

What is claimed is:

1. A polyurethane solution containing alkoxysilane structural units, wherein the polyurethane is the reaction product of
    a) at least one at least difunctional polyol having an hydroxyl number of from 8 to 200,
    b) at least one at least difunctional polyisocyanate having a molecular weight of 140 to 1,500,
    c) at least one low molecular weight at least difunctional alcohol and/or amine having a molecular weight of 32 to 500,
    d) at least one compound containing at least one alkoxysilane group and an isocyanate-reactive group, and
    e) optionally, a monofunctional compound containing an amino, alcohol or oxime group, other than a compound falling within the scope of component d),
in the presence of an organic solvent, wherein the equivalents of component d) are at least 50% of the total equivalents of components d) and e) and wherein the number of terminal alkoxysilane groups must be at least 50 wt. % of all the incorporated alkoxysilane groups and wherein the theoretical content of —Si—(O—)$_3$ structural units is less than 1.2 wt. %, based on the total solids content of the polyurethane.

2. The polyurethane solution of claim 1 wherein the polyurethane is reaction product of
    a) 40 to 92 wt. % of said at least one at least difunctional polyol,
    b) 7 to 50 wt. % of at least one at least difunctional polyisocyanate having a molecular weight of 140 to 1,500,
    c) 0.5 to 20 wt. % of at least one low molecular weight at least difunctional alcohol and/or amine having a molecular weight of 32 to 500,
    d) 0.1 to 5 wt. % of at least one compound containing at least one alkoxysilane group and an isocyanate-reactive group and
    e) optionally a monofunctional compound containing an amino, alcohol or oxime group, other than a compound falling within the scope of component d),
wherein the percentages are based on weight of the polyurethane and the equivalents of component d) are at least 75% of the total equivalents of components d) and e).

3. The polyurethane solution of claim 1 wherein the polyurethane is the reaction product of
    a) 47 to 88 wt. % of said at least one at least difunctional polyol,
    b) 10 to 40 wt. % of at least one at least difunctional polyisocyanate having a molecular weight of 140 to 1,500,
    c) 0.8 to 17 wt. % of at least one low molecular weight at least difunctional alcohol and/or amine having a molecular weight of 32 to 500,
    d) 0.2 to 3.0 wt. % of a compound containing an alkoxysilane group and an isocyanate-reactive group and
    e) 0–0.5 wt. % of a monofunctional compound containing an amino, alcohol or oxime group, other than a compound falling within the scope of component d),
        wherein the percentages are based on weight of the polyurethane and the equivalents of component d) are at least 95% of the total equivalents of components d) and e).

4. The polyurethane solution of claim 1 wherein at least 50 wt. % of component a) is at least one polycarbonate diol having a molecular weight of 900 to 2,500.

5. The polyurethane solution of claim 1 wherein component a) contains 10 to 60 wt. % of at least one hydrophilic polyol and 23 to 50 wt. % of at least one non-hydrophilic polyol, wherein the percentages are based on the total solids content of the polyurethane, provided that the total amount of component a) is not more than 92 wt. % of the total solids content of the polyurethane.

6. The polyurethane solution of claim 1 wherein at least 75 wt. % of component b) is isophorone diisocyanate.

7. The polyurethane solution of claim 1 wherein the component b) comprises 2,4- and/or 2,6-diisocyanatotoluene and/or 4,4'-diisocyanatodiphenylmethane.

8. The polyurethane solution of claim 1 wherein component b) comprises at least one diisocyanate containing allophanate groups.

9. The polyurethane solution of claim 1 wherein 2 to 16 wt. % of component c) is a hydrophilic difunctional compound containing salt groups.

10. The polyurethane solution of claim 1 wherein component c) comprises a hydrophilic compound and a) comprises a hydrophilic polyol.

11. The polyurethane solution of claim 1 wherein component c) comprises a positive amount up to 2 wt. %, based on the total solids content of the polyurethane, of a diamino-functional compound containing alkoxysilane groups.

12. The polyurethane solution of claim 1 wherein component c) comprises 0.1 to 1.5 wt. %, based on the total solids content of the polyurethane, of hydrazine hydrate, adipic acid dihydrazide and/or the reaction product of 2 moles propylene carbonate with 1 mole hydrazine.

13. The polyurethane solution of claim 1 wherein component d) comprises 0.3 to 1.3 wt. %, based on the total solids content of the polyurethane, of a compound containing an isocyanate-reactive group and at least one alkoxysilane group.

14. The polyurethane solution of claim 1 wherein component d) comprises a monoamino-functional reaction product containing aspartic acid ester structures of a monoamino-functional alkoxysilane with 0.5 to 1.1 equivalents of a maleic acid alkyl ester.

15. The polyurethane solution of claim 1 wherein component d) comprises 0.3 to 1.3 wt. %, based on the total solids content of the polyurethane, of a monoamino-functional alkoxysilane and component c) comprises 0.1 to 2.0 wt. %, based on the total solids content of the polyurethane, of a diamino-functional alkoxysilane, provided that the weight of terminal alkoxysilane groups is at least 50 wt. % of all the alkoxysilane groups incorporated.

16. A process for preparing the polyurethane solution of claim 1 which comprises
 a) preparing an isocyanate-functional polyurethane in a one- or two-stage reaction from at least one polyol a), at least one difunctional polyisocyanate b), and at least one low molecular weight component c),
 b) subsequently reacting the product of step a) with at least one compound d) containing an alkoxysilane group and an isocyanate-reactive group and optionally a monofunctional component e) to obtain a polyurethane with alkoxysilane structural units which no longer contains free isocyanate groups, and
 c) adding an organic solvent either before, during or after step a) in an amount such that the resulting polyurethane solution with alkoxysilane end groups has a solids content of 9 to 65 wt. %.

17. The process of claim 16 which comprises
 a) reacting components a), b), and optionally c) in a one-stage reaction, optionally in the presence of solvents, to obtain an isocyanate-functional polyurethane,
 b) optionally adding an additional amount of polyisocyanate b) and/or low molecular weight difunctional component c) until a viscosity of from 1,000 to 200,000 mPas (at 23° C.) and molecular weight (Mn) of from 4,000 to 500,000 is achieved, and
 c) chain-stopping the reaction by adding a monoamino-functional compound d) containing an alkoxysilane group.

18. A paint, coating, sealant or adhesive compositions containing the polyurethane solution of claim 1.

19. A plastic coated with the polyurethane solution of claim 1.

20. A textile or leather coated with the polyurethane solution of claim 1.

21. A textile coated with the polyurethane solution of claim 1, wherein the coating is permeable to water vapor.

22. A polyurethane solution containing alkoxysilane structural units, wherein the polyurethane is the reaction product of
 a) at least one at least difunctional polyol having an hydroxyl number of from 8 to 200 and a molecular weight of up to 16,000,
 b) at least one at least difunctional polyisocyanate having a molecular weight of 140 to 1,500,
 c) at least one low molecular weight at least difunctional alcohol and/or amine having a molecular weight of 32 to 500,
 d) at least one compound containing at least one alkoxysilane group and an isocyanante-reactive group, and
 e) optionally, a monofunctional compound containing an amino, alcohol or oxime group, other than a compound falling within the scope of component d),
in the presence of an organic solvent, wherein the equivalents of component d) are at least 50% of the total equivalents of components d) and e) and wherein the number of terminal alkoxysilane groups must be at least 50 wt. % of all the incorporated alkoxysilane groups and wherein the theoretical content of —Si—(O—)$_3$ structural units is less than 1.2 wt. %, based on the total solids content of the polyurethane.

23. A polyurethane solution containing alkoxysilane structural units, wherein the polyurethane is the reaction product of
 a) at least one at least difunctional polyol having a molecular weight of 561 to 16,000,
 b) at least one at least difunctional polyisocyanate having a molecular weight of 140 to 1,500,
 c) at least one low molecular weight at least difunctional alcohol and/or amine having a molecular weight of 32 to 500,
 d) at least one compound containing at least one alkoxysilane group and an isocyanante-reactive group, and
 e) optionally, a monofunctional compound containing an amino, alcohol or oxime group, other than a compound falling within the scope of component d),
in the presence of an organic solvent, wherein the equivalents of component d) are at least 50% of the total equivalents of components d) and e) and wherein the number of terminal alkoxysilane groups must be at least 50 wt. % of all the incorporated alkoxysilane groups and wherein the theoretical content of —Si—(O—)$_3$ structural units is less than 1.2 wt. %, based on the total solids content of the polyurethane.

* * * * *